United States Patent
Chiduruppa et al.

(10) Patent No.: US 9,413,670 B2
(45) Date of Patent: Aug. 9, 2016

(54) SIP LOAD BALANCING

(71) Applicant: ORACLE INTERNATIONAL CORPORATION, Redwood Shores, CA (US)

(72) Inventors: Sreenivas Chiduruppa, Westford, MA (US); Vikas Aralaguppe Rajegowda, Dracut, MA (US); Paul F. Smith, Norton, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 211 days.

(21) Appl. No.: 14/505,924

(22) Filed: Oct. 3, 2014

(65) Prior Publication Data
US 2016/0099871 A1   Apr. 7, 2016

(51) Int. Cl.
*G06F 15/173* (2006.01)
*H04L 12/803* (2013.01)
*H04L 29/08* (2006.01)
*H04L 29/06* (2006.01)

(52) U.S. Cl.
CPC .......... *H04L 47/125* (2013.01); *H04L 65/1006* (2013.01); *H04L 65/80* (2013.01); *H04L 67/141* (2013.01)

(58) Field of Classification Search
CPC ................... H04L 29/08144; H04L 29/08153; H04L 29/08243; H04L 61/1529
USPC ................... 709/223, 226, 225, 200; 370/352
See application file for complete search history.

(56) References Cited

U.S. PATENT DOCUMENTS

| | | | |
|---|---|---|---|
| 8,175,572 B2 | 5/2012 | Kim | |
| 8,369,313 B2 | 2/2013 | Lu et al. | |
| 2004/0088424 A1 | 5/2004 | Park et al. | |
| 2008/0031227 A1* | 2/2008 | Wang | H04L 65/1016 370/352 |
| 2010/0136970 A1 | 6/2010 | Mui et al. | |
| 2010/0167762 A1 | 7/2010 | Pandey et al. | |
| 2010/0296636 A1* | 11/2010 | Li | H04M 3/42017 379/87 |
| 2013/0019012 A1 | 1/2013 | Henrikson et al. | |
| 2013/0054806 A1 | 2/2013 | Francis et al. | |
| 2014/0006632 A1 | 1/2014 | Evens | |
| 2014/0185490 A1* | 7/2014 | Holm | H04L 41/0893 370/259 |

OTHER PUBLICATIONS

Oracle Data Sheet; Oracle Communications; "Oracle Communications Core Session Manager"; 2013.

* cited by examiner

*Primary Examiner* — El Hadji Sall
(74) *Attorney, Agent, or Firm* — Miles & Stockbridge P.C.

(57) ABSTRACT

An Interrogating Call Session Control Function ("I-CSCF") server load balances Session Initiation Protocol ("SIP") users over an Internet Protocol Multimedia Subsystem ("IMS") network. The I-CSCF server establishes a Diameter connection between a first Serving Call Session Control Function ("S-CSCF") server and receives a dynamically adjusted capacity and a status information from the first S-CSCF server. The I-CSCF server further receives from user equipment a request to initiate a SIP communication session over the IMS network. The I-CSCF server then selects an assigned S-CSCF server for the SIP communication session based at least on the dynamically adjusted capacity and the status information

20 Claims, 6 Drawing Sheets

Fig. 6

SIP LOAD BALANCING

FIELD

One embodiment is directed generally to a communication network, and in particular to a Session Initiation Protocol based communication session over a communication network.

BACKGROUND INFORMATION

Session Initiation Protocol ("SIP") is an application-layer control protocol for creating, modifying, and terminating sessions with one or more users. These sessions include Internet telephone calls, multimedia distribution and multimedia conferences. SIP invitations create sessions that allow the users to agree on a set of compatible media types based on session descriptions configurable within the protocol. A SIP session with one or more users can occur over a SIP based network, such as the Internet Protocol Multimedia Subsystem ("IMS") network.

IMS is a standardized next generation networking architecture for providing multimedia services in mobile/wireless and fixed/wire-line communication networks. IMS uses the Internet protocol ("IP") for packet-data communications generally, and voice over IP ("VoIP") for voice communications, based on a 3rd Generation Partnership Project ("3GPP/3GPP2") standardized implementation of SIP. IMS includes session control, connection control, and an application services framework along with subscriber and services data. It enables the use of new converged voice and data services, while facilitating the interoperability of these converged services between subscribers.

SUMMARY

One embodiment is an Interrogating Call Session Control Function ("I-CSCF") server that load balances Session Initiation Protocol ("SIP") users over an Internet Protocol Multimedia Subsystem ("IMS") network. The I-CSCF server establishes a Diameter connection between a first Serving Call Session Control Function ("S-CSCF") server and receives a dynamically adjusted capacity and a status information from the first S-CSCF server. The I-CSCF server further receives from user equipment a request to initiate a SIP communication session over the IMS network. The I-CSCF server then selects an assigned S-CSCF server for the SIP communication session based at least on the dynamically adjusted capacity and the status information.

DETAILED DESCRIPTION

One embodiment is a Diameter application profile load balancer that dynamically load balances SIP users to Serving Call Session Control Function ("S-CSCF") servers over an IMS network by getting dynamically adjusted capacity, based on key performance indicators, and service information, for each S-CSCF server. The load balancer uses this information to distribute the end users across all available S-CSCF servers.

Figure 1:
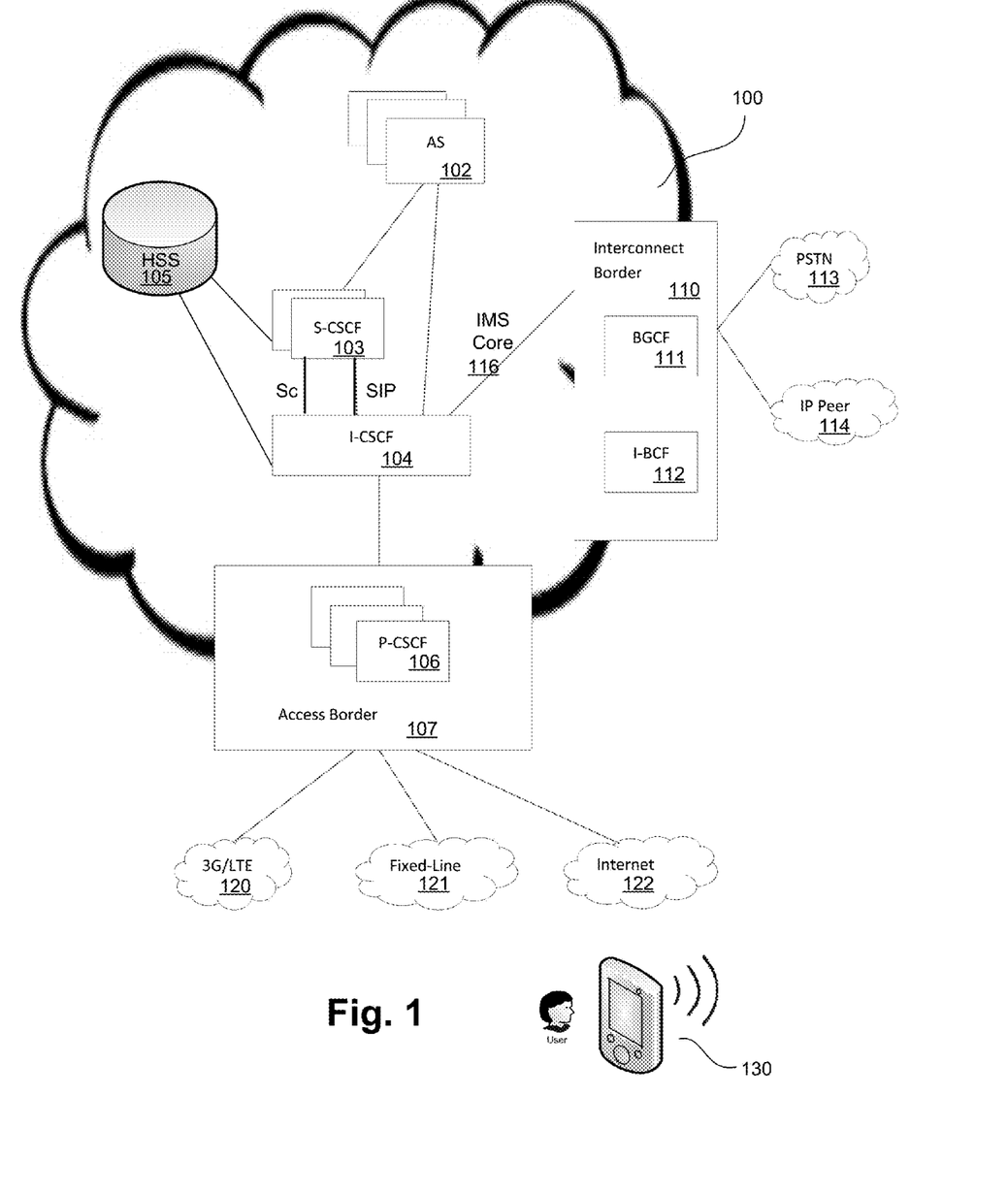
FIG. 1 is an overview diagram of an IMS network including network elements that implement embodiments of the present invention and/or interact with embodiments of the present invention.

FIG. 1 is an overview diagram of an IMS network 100 including network elements that implement embodiments of the present invention and/or interact with embodiments of the present invention. Network 100 includes an IMS core 116 that includes an Interrogating Call Session Control Function ("I-CSCF") 104 and one or more Serving Call Session Control Functions ("S-CSCF") 103 or "serving functions". In one embodiment, I-CSCF 104 is implemented by a Subscriber Load Balancer and Route Manager ("SLRM") from Oracle Corp. and performs the load balancing disclosed herein. In one embodiment, each S-CSCF 103 is implemented by a Core Session Manager ("CSM") from Oracle Corp. that provides a serving function/registrar, and supplies an adjusted capacity based on key performance indicators to I-CSCF 104, which uses this information for load balancing.

IMS network 100 further includes an access border 107 that includes one or more Proxy Call Session Control Functions ("P-CSCF") 106 or "entry points" such as Session Border Controllers ("SBC"). In general, the CSCF entities are implemented by one or more SIP servers or proxies. I-CSCF 104 is coupled to each S-CSCF 103 via a SIP interface for transmitting SIP packets, and an Sc Diameter interface (referred to as the "Sc interface") for load balancer functionality disclosed herein (e.g., advertise KPI's to I-CSCF 104, register S-CSCF 103 to I-CSCF 104, enable I-CSCF 104 to manage S-CSCF's 103). In one embodiment, the Sc interface carries only Diameter packets.

IMS network 100 further includes one or more Application Servers 102 ("AS") and a Home Subscriber Server 105 ("HSS"). An Interconnect Border 110 couples IMS core 116 to various external networks, including the Public Switched Telephone Network 113 ("PSTN") and an Internet Protocol ("IP") peer network 114.

Access border 107 couples User Equipment 130 ("UE") to IMS network 100. UE 130 may be any device used by an end-user for communication, including a smartphone, a laptop computer, a tablet, etc. UE 130 can connect to IMS network 100 through a third generation Long Term Evolution ("3G/LTE") network 120, a fixed-line network 121, via the Internet 122, or using any known communication methods.

Figure 2:
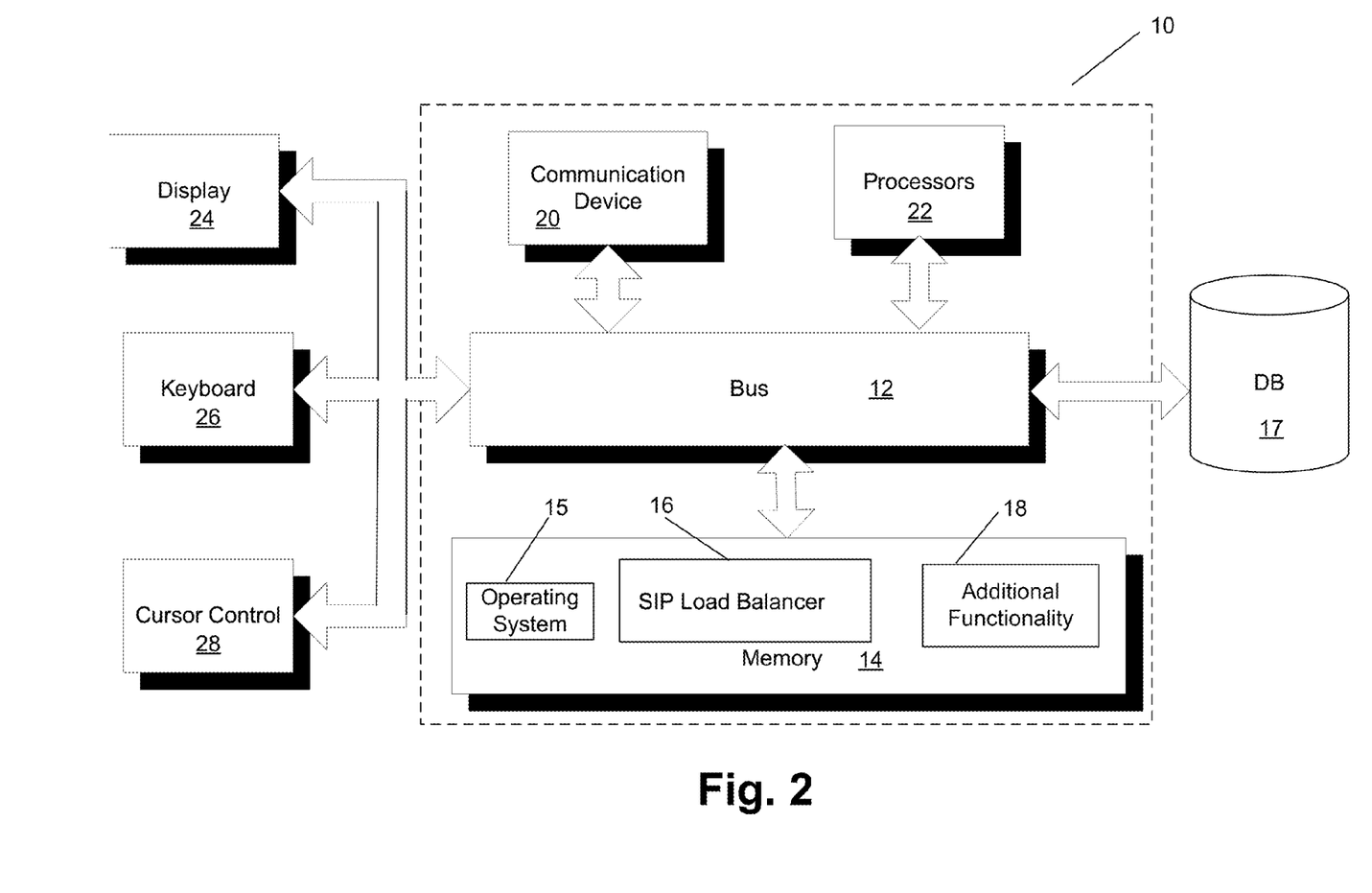
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of I-CSF 104, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a SIP load balancer module 16 for load balancing SIP users, and all other functionality disclosed herein. System 10 can be part of a larger system, such as added functionality to the "Oracle Communications Core Session Manager" from Oracle Corp. Therefore, system 10 can include one or more additional functional modules 18 to include the additional functionality. A database 17 is coupled to bus 12 to provide centralized storage for modules 16 and 18.

Referring again to FIG. 1, in the prior art, a user at a UE 130 would register with one of S-CSCFs 103 in order to carry out a SIP based communication session. UE 130 registers with IMS network 100 by sending a REGISTER request to P-CSCF 106. P-CSCF 106 then sends the REGISTER request to I-CSCF 104. As per the 3GPP standard, I-CSCF 104 then picks one of the S-CSCF 103 servers based on capabilities and sends the REGISTER request to the selected S-CSCF 103. I-CSCF 104 learns of the available S-CSCF 103 servers' capabilities after performing an HSS 105 lookup using a User-Authorization-Request/User-Authorization-Answer ("UAR/UAA") transaction. After a successful registration, the user is always served by this S-CSCF server throughout the SIP session.

One disadvantage with this prior art approach is that I-CSCF 104 has no way of knowing the runtime key performance indicator ("KPI") information (e.g., memory usage, processor usage, maximum number of endpoints, etc.) of the available S-CSCF servers. This runtime KPI information is a particularly important factor for load balancing such as with Network Function Virtualization ("NFV"), where S-CSCFs can be scaled in of and scaled out of as necessary.

In contrast to the prior art, embodiments of the present invention include a Sc communication Diameter interface ("Sc interface") that is integrated into I-CSCF 104 and each S-CSCF 103. The Sc interface enables I-CSCF 104 to dynamically manage multiple S-CSCFs, learn runtime KPI information of S-CSCFs and distribute load based on runtime KPIs and capabilities. In addition, it provides a single IP interface entry point to the S-CSCF powered IMS core 116.

The Sc interface in one embodiment is a "Diameter" protocol based application. Diameter is an authentication, authorization, and accounting protocol ("AAA") for computer/communication networks. The Diameter base protocol is defined by RFC 6733 and defines the minimum requirements for an AAA. The Diameter base protocol is intended to provide an AAA framework for applications such as network access or Internet Protocol ("IP") mobility in both local and roaming situations.

Diameter applications can extend the base protocol by adding new commands, attributes, or both. Embodiments can also add an application state machine above the base protocol for end to end sessions passing through different diameter nodes. A Diameter application is not a software application but is a protocol based on the Diameter base protocol. Each application is defined by an application identifier and can add new command codes and/or new mandatory attribute-value pairs ("AVP"s). Examples of Diameter applications include various applications in the 3GPP mobile telecommunication standards.

Figure 3:
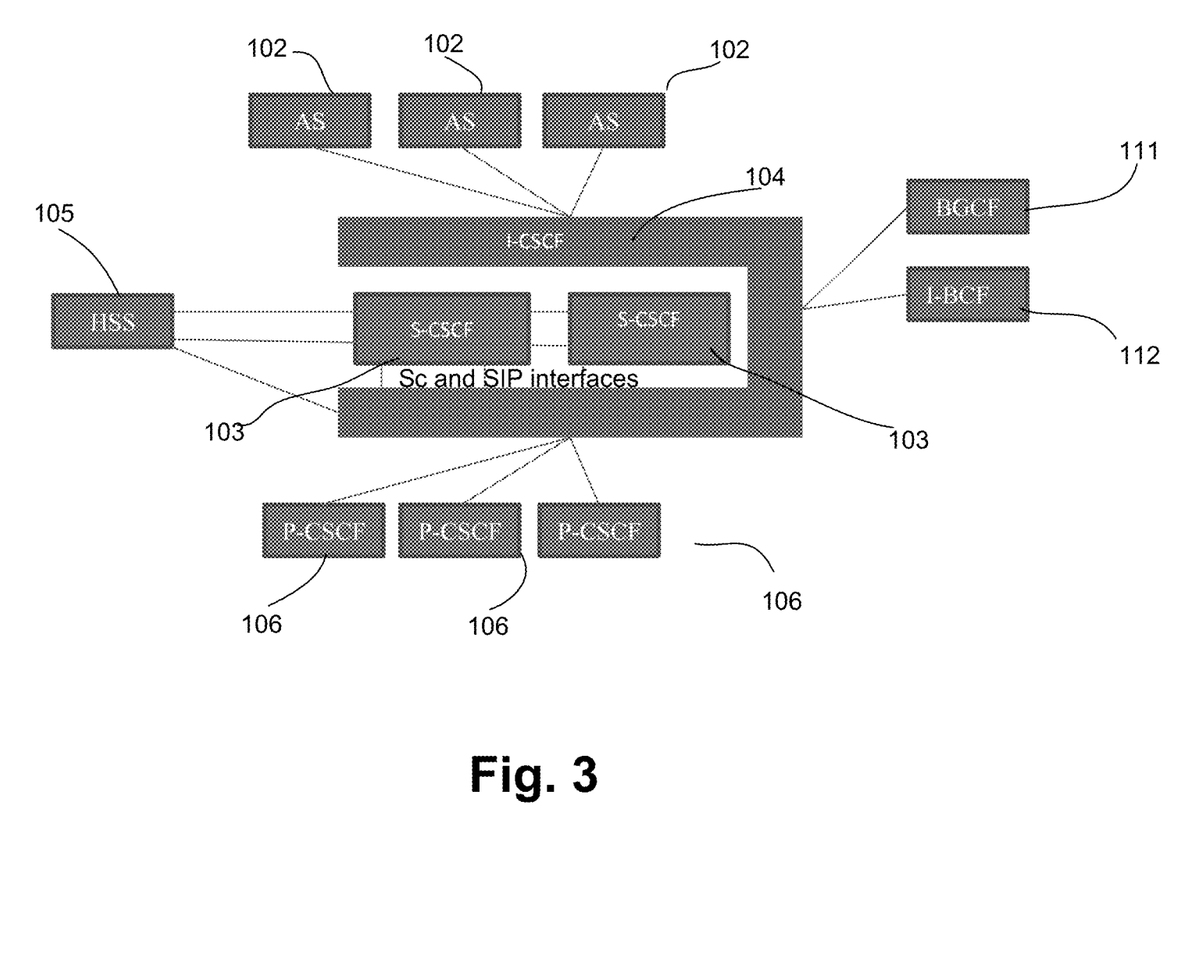
FIG. 3 is a block diagram of another view of a portion of the IMS network of FIG. 1 in accordance with one embodiment.

FIG. 3 is a block diagram of another view of a portion of IMS network 100 of FIG. 1 in accordance with one embodiment. In FIG. 3, the Sc interface is shown as integrated with the functionality of I-CSCF 104 and S-CSCFs 103. In operation, a P-CSCF 106 entry point sends a REGISTER message to I-CSCF 104. I-CSCF 104 selects one of S-CSCFs 103 based on capabilities and information received over the Sc interface. When the Registration completes, HSS 105 will have an assigned S-CSCF 103. In the case of an AS 102, an initial entry point would be an INVITE. I-CSCF 104 is in the communication path for the completion of the transaction, and all further in dialog messaging bypasses I-CSCF 104. I-CSCF 104 will need to select an S-CSCF 103 if originating/terminating services are requested but the corresponding user is not registered and has a corresponding Initial Filter Criteria ("IFC") to execute.

Figure 4:
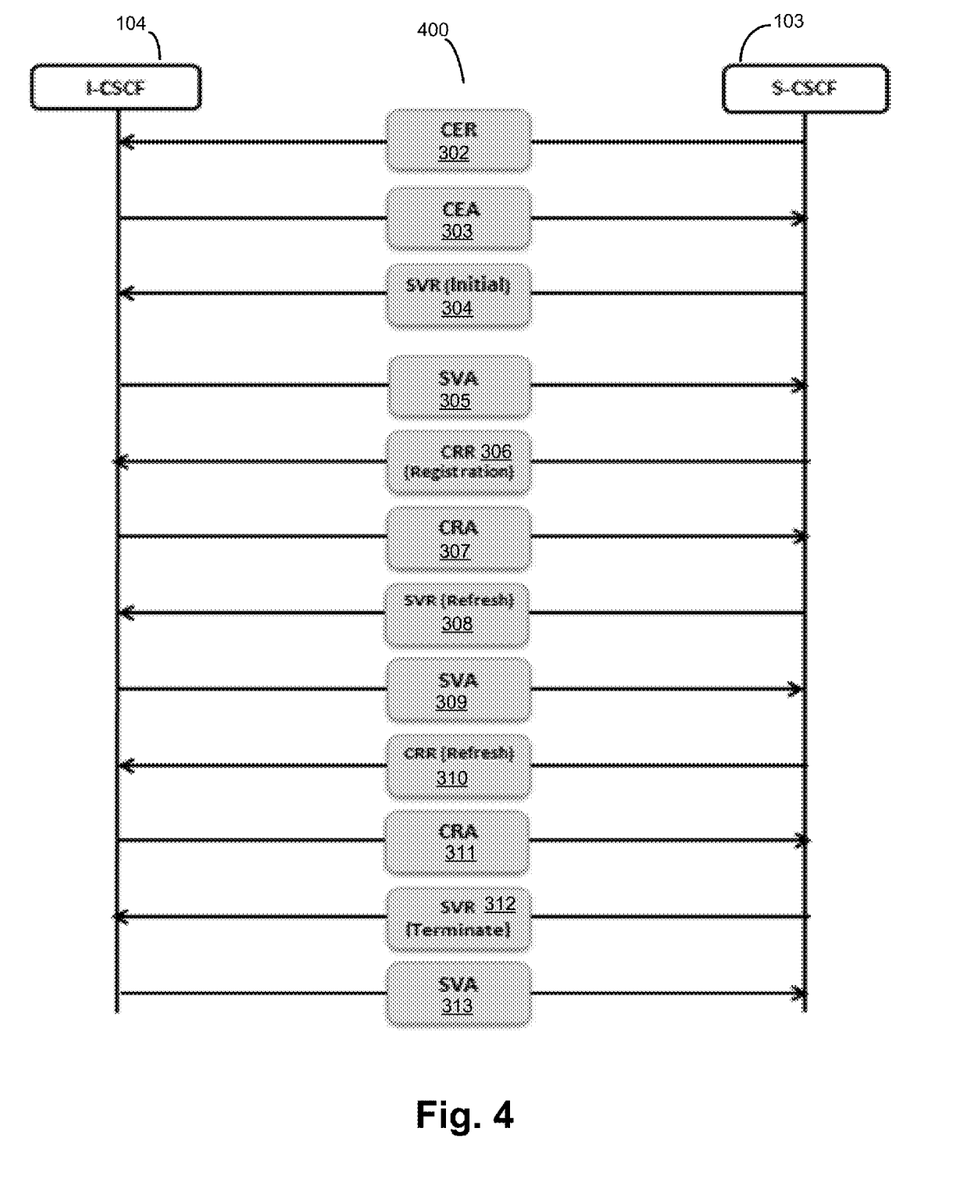
FIG. 4 illustrates a call flow diagram between a S-CSCF and an I-CSCF via an Sc interface in accordance with one embodiment.

FIG. 4 illustrates a call flow diagram 400 between S-CSCF 103 and I-CSCF 104 via the Sc interface in accordance with one embodiment. As shown in FIG. 4, when S-CSCF 103 is ready to serve users, it establishes a Transmission Control Protocol ("TCP") connection to I-CSCF 104 and initiates a Diameter Capabilities-Exchange-Request Capabilities-Exchange-Answer ("CER/CEA") transaction (at 302 and 303). On a successful CER/CEA handshake, the Diameter connection is considered to be established. S-CSCF 103 initiates a service association via a Diameter Service-Assoc-Request/Service-Assoc-Answer ("SVR/SVA") transaction (at 304 and 305) and registers the supported IMS cores via a Diameter Core-Registration-Request/Core-Registration-Answer ("CRR/CRA") transaction (at 306 and 307). S-CSCF 103 will continue to periodically refresh the service association, and update the runtime performance metrics and the registered cores (at 308-311).

When shutting down or otherwise going out of service, S-CSCF 103 terminates the service association with a Diameter SVR/SVA (TERM) transaction (at 312 and 313). This ensures that I-CSCF 104 no longer manages S-CSCF 103 nor assigns end points to it.

Figure 5:
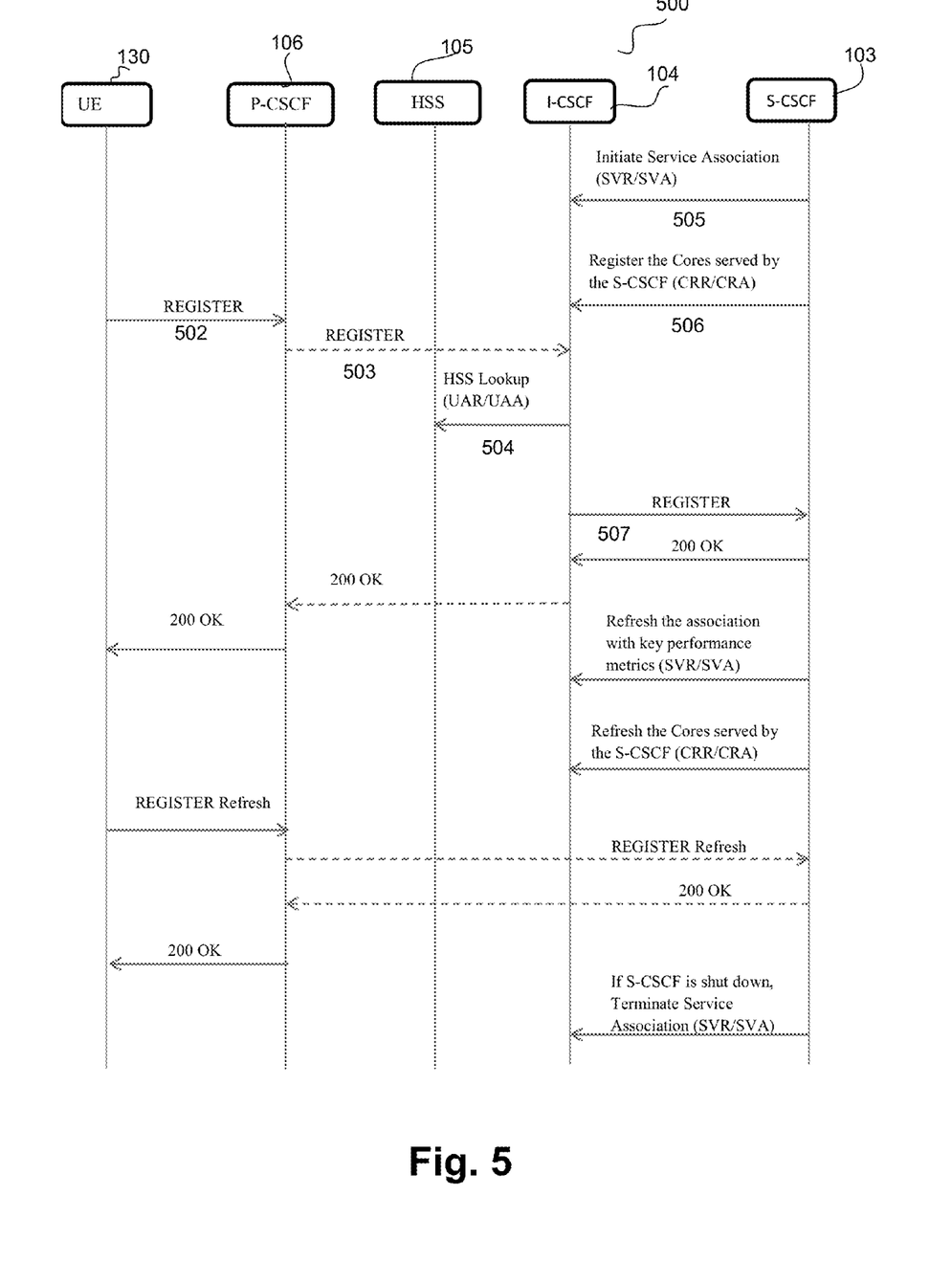
FIG. 5 illustrates a call flow diagram for implementing messaging for endpoint registration with load balancing in accordance with one embodiment.

FIG. 5 illustrates a call flow diagram 500 for implementing messaging for endpoint registration with load balancing in accordance with one embodiment. As shown, endpoint/UE 130 sends the initial register message (502) to P-CSCF 106. P-CSCF 106 forwards the REGISTER message to I-CSCF 104 (503). I-CSCF 104 looks up capabilities in HSS 105 and to check if an endpoint is already assigned to S-CSCF 103 (504). If not, I-CSCF 104 selects (507) the S-CSCF 103 using capabilities and information received over the Sc interface (505 and 506). I-CSCF 104 also updates the local S-CSCF KPI by the user assigned to S-CSCF 103. This local copy will be replaced when the S-CSCF resends the KPI information. This is needed in one embodiment to smooth the load between KPI updates from the S-CSCFs. When the registration has completed, the I-CSCF performing the load balancing is bypassed for all further messaging.

Figure 6:
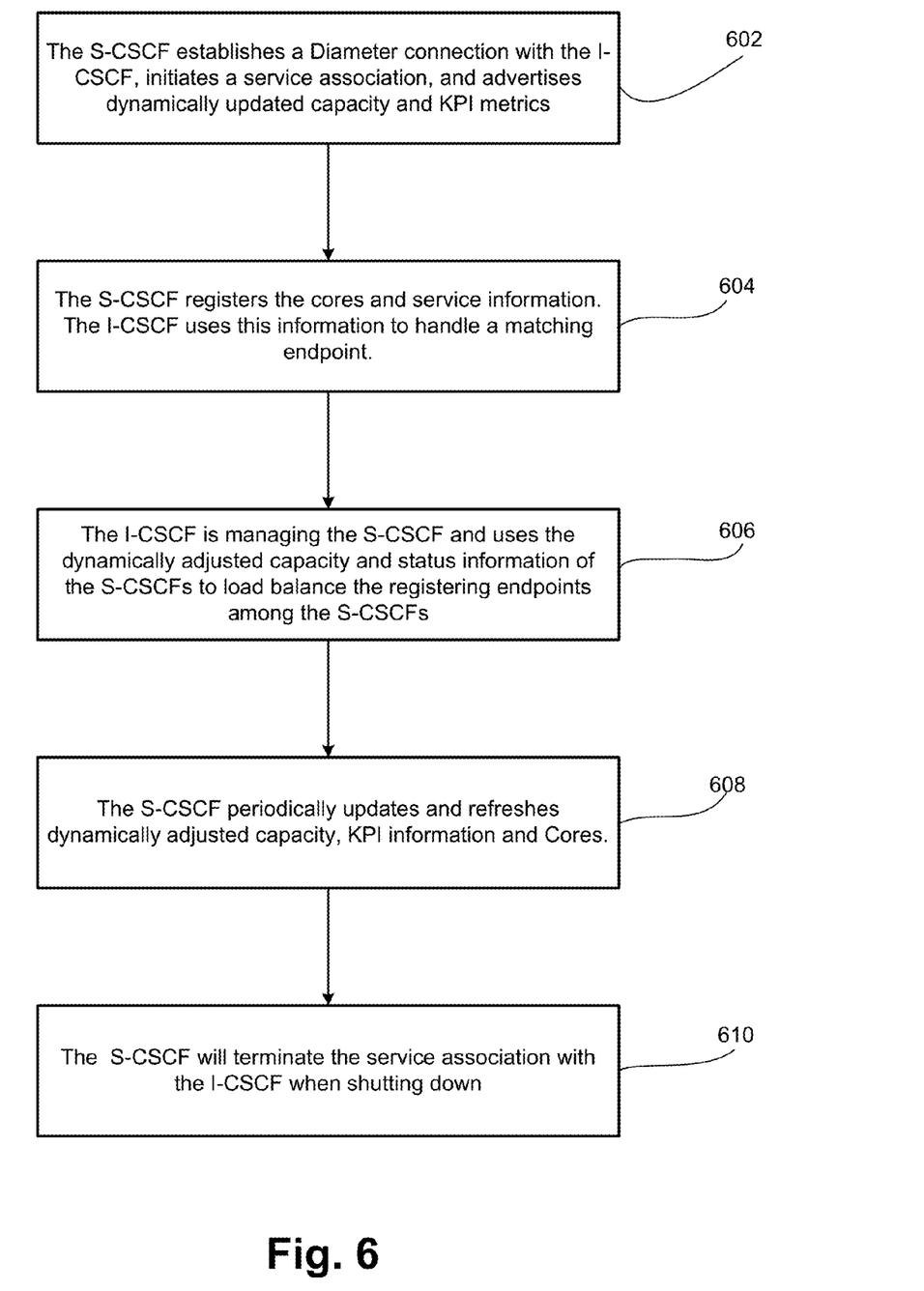
FIG. 6 is a flow diagram of the SIP load balancer module of FIG. 1 when load balancing SIP users in accordance with embodiments of the present invention.

FIG. 6 is a flow diagram of SIP load balancer module 16 of FIG. 1 when load balancing SIP users in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, when an S-CSCF 103 is ready to serve users, it establishes a Diameter connection (the "Sc interface") with I-CSCF 104 and initiates a service association. S-CSCF 103 advertises dynamically updated capacity such as the maximum number of endpoints supported, and KPI metrics such as processor capacity, memory capacity and endpoints serviced.

At 604, after setting up the service association, S-CSCF 103 registers the cores and service information (i.e., the SIP uniform resource identifier ("URI") to reach the S-CSCF). A core identifies the configured domains, HSS server 105, and the routing interface on I-CSCF 104. I-CSCF 104 uses this information to handle a matching endpoint. The name of the core maps to domains that are being served by the S-CSCF, the HSS server to be used for the serving the endpoint matching the configured domain, and the SIP interface to be used to route the matching SIP request to the S-CSCF.

Specifically, the following is configured on the S-CSCF: HSS servers, SIP interfaces, domains and the core name. The core name is the key to identify a group which consists of the HSS server, the SIP interface and domains. The S-CSCF registers the cores with the I-CSCF. The I-CSCF uses the registered core to identify the group which specifies the domains being serviced by the S-CSCF, the HSS server to be used, and the SIP interface to be used to route the SIP requests to the S-CSCF.

At 606, I-CSCF 104 is managing S-CSCF 103. I-CSCF 104 continues to use the dynamically adjusted capacity and status information of the S-CSCFs 103 to load balance existing and new registering endpoints among S-CSCFs 103.

At 608, S-CSCF 103 will periodically update and refresh dynamically adjusted capacity, KPI information and cores. Therefore, I-CSCF 104 uses the latest information to load balance the endpoints among S-CSCFs 103.

At 610, when S-CSCF 103 is shutting down or otherwise going out of service, it will terminate the service association with I-CSCF 104. I-CSCF 104 will no longer manage S-CSCF 103 nor assign any endpoints.

The Sc interface in accordance with embodiments, as described, is a Diameter application defined on top of the Diameter base protocol for communication between I-CSCF 104 and S-CSCFs 103. This protocol provides the framework for at least the following:

S-CSCFs 103 dynamically register and de-register with I-CSCF 104 in an ad hoc manner.

S-CSCFs 103 advertise dynamically adjusted capacity and KPI's to I-CSCF 104.

S-CSCFs 103 register cores and corresponding service information to I-CSCF 104.

I-CSCF 104 manages availability of S-CSCFs 103 and load balances endpoints.

Embodiments add the following new Diameter Messages and AVP's:

Diameter Messages

Service-Assoc-Request/Service-Assoc-Answer (SAR/SAA):

```
<SVR> ::= < Diameter Header: REQ, PXY >
    { Vendor-Specific-Application-Id }
    { Origin-Host }
    { Origin-Realm }
    { Destination-Realm }
    { Service-Assoc-Id }
    { Request-Type }
    [ Destination-Host ]
    [ Cluster-Id ]
    [ Pct-Cpu-Used ]
    [ Pct-Memory-Used ]
    [ EPs-Serviced-Count ]
    [ Protocol-Version ]
    [ Software-Version ]
    [ Service-Assoc-Exp ]
    [ Max-Endpoints-Supported ]
<SVA> ::= < Diameter Header: >
    { Vendor-Specific-Application-Id }
    { Origin-Host }
    { Origin-Realm }
    { Service-Assoc-Id }
    { Request-Type }
    [ Service-Assoc-Exp ]
    [ Protocol-Version ]
    [ Software-Version ]
    [ Result-Code ]
    [ Experimental-Result ]
```

Embodiments use the SAR/SAA message by S-CSCF 103 in at least the following scenarios:

Request-Type (INITIAL): on boot up S-CSCF 103 sends the request to setup service association with I-CSCF 104. This will include the S-CSCF's KPI and dynamically adjusted capacity information. The Service-Assoc-Exp AVP will specify the expiration time for the association.

Request-Type (REFRESH): this message is used by S-CSCF 103 to refresh/update KPI and capacity information to I-CSCF 104. If not refreshed and S-CSCF 103 state expires, then I-CSCF 104 considers the Capacity and KPI information to be invalid and S-CSCF 103 to be out of sync.

Request-Type (TERM): this message is used by S-CSCF 103 to terminate service association with I-CSCF 104. On receiving this message, I-CSCF 104 will remove peer S-CSCF103 and clear all its state.

The response code in the answer message will indicate if the request was a success or failure.

Core-Registration-Request/Core-Registration-Answer (CRR/CRA):

```
<CRR> ::= < Diameter Header: REQ, PXY >
            { Vendor-Specific-Application-Id }
            { Origin-Host }
            { Origin-Realm }
            { Destination-Realm }
            { Service-Assoc-Id }
            { Registration-Type }
            [ Destination-Host ]
            [ Core-Reg-Exp ]
          * [ Core-Info ]
<CRA> ::= < Diameter Header: >
            { Vendor-Specific-Application-Id }
            { Origin-Host }
            { Origin-Realm }
            { Service-Assoc-Id }
            { Registration-Type }
            [ Core-Reg-Exp ]
            [ Result-Code ]
            [ Experimental-Result ]
```

S-CSCF 103 uses the CRR/CRA message in at least the following scenarios:

Registration-Type (REGISTRATION): S-CSCF 103 sends the request to register the available cores to I-CSCF 104. The registration expiration will be included in the Core-Reg-Exp AVP. If the registration is not refreshed and registration expires, then I-CSCF 104 will consider that core to be timed out.

Registration-Type (DE-REGISTRATION): this message is used by S-CSCF 103 to de-register a core on I-CSCF 104. I-CSCF 104 will remove the specified core for S-CSCF 103 and S-CSCF 103 is considered to be no longer serving the core.

Registration-Type (RE-REGISTRATION): this message is used by S-CSCF 103 to refresh and update the registration of the cores. On receiving this message, I-CSCF 104 will reset the expiration time and update the core information.

The response code in the answer message will indicate if the request was a success or failure.

Sc Interface AVP's

Core-Info AVP:

The Service-Info AVP is a grouped AVP and is used to send service related information of S-CSCF 103 in CRR messages. This grouped AVP has the following information in it:

Core-Info::=<AVP header>

{Ims-Core}

*[Service-Info]

Registration-Type AVP

The Registration-Type AVP is of type Enumerated and indicates the type of registration in CRR request. The following values are defined:

REGISTRATION (0): this indicates registration of cores for S-CSCF 103.

DE-REGISTRATION (1): this indicates de-registration of cores for S-CSCF 103.

RE-REGISTRATION (2): this indicates refresh/update/addition of cores for S-CSCF 103.

Pct-Memory-Used AVP:

The Pct-Memory-Used AVP is of type Unsigned32. This AVP is used to indicate the percentage memory used in S-CSCF 103. This AVP is included in SVR request.

Pct-CPU-Used AVP:

The Pct-Cpu-Used AVP is of type Unsigned32. This AVP is used to indicate the percentage CPU used in S-CSCF 103. This AVP is included in SVR request.

EPs-Serviced-Count AVP:

The EPs-Serviced-Count AVP is of type Unsigned32. This AVP gives the number of endpoints currently serviced by S-CSCF 103. This AVP is included in SVR request.

Cluster-Id AVP:

The Cluster-Id AVP is of type String. This AVP uniquely identifies the cluster of S-CSCF 103. This AVP is included in the SVR request. This AVP identifies the Cluster to which S-CSCF 103 belongs to. I-CSCF 104 uses the cluster Id to assign end points to a preferred cluster.

Core-Reg-Exp AVP:

The Core-Reg-Exp is of type Unsigned32. This AVP gives expiration time in seconds and is included in the CRR request.

Protocol-Version AVP:

The Protocol-Version AVP is of type Unsigned32. This AVP specifies the interface version in the SVR request. This AVP is included only in the initial SVR request.

Software-Version AVP:

The Software-Version AVP is of type String. This AVP specifies the Software Version running on S-CSCF 103 or I-CSCF 104. This AVP is included only in the initial SVR request.

IMS-Core AVP:

The IMS-Core AVP is of type string. This AVP specifies the IMS core served by the S-CSCF 103. I-CSCF 104 uses this core name to identify domains, HSS server and the routing interface to be used for a matching endpoint. This AVP is included in the CRR request.

Service-Info AVP:

The Service-Info AVP is of type grouped. This AVP has SIP URI of S-CSCF 103. This AVP is included in the SVR request. This is the SIP interface information of S-CSCF 103 that is used by I-CSCF 104 to forward SIP requests.

Max-EPs-Supported AVP:

The Max-EPs-Supported AVP is of type Unsigned32. This AVP specifies the max number of contacts that a S-CSCF 103 can support. It is dynamically adjusted based on available system resources on S-CSCF 103.

In one embodiment, I-CSCF 104 will perform the following functionality:

I-CSCF 104 waits for new S-CSCFs 103 on the Diameter Sc interface.

I-CSCF 104 starts managing S-CSCF 103, when it receives an initial Service Association request (SVR) from S-CSCF 103. I-CSCF 104 maintains status, dynamically adjusted capacity and KPI's—percentage CPU used, percentage memory used and end points serviced count.

On receiving the Core Registration Request (CRR), I-CSCF 104 has knowledge of the cores supported on S-CSCF 103 and the service information. I-CSCF 104 uses the core to identify domains, HSS server and the routing interface to be used for a matching endpoint.

I-CSCF 104 refreshes and updates S-CSCF 103 status information on receiving periodic SVR refreshes. If no refresh is received and the S-CSCF 103 status expires, then I-CSCF 104 considers the S-CSCF 103 to be out of sync and will be least preferred.

I-CSCF 104 refreshes and updates the S-CSCF Core information on receiving periodic CRR refreshes. If no refresh is received and the core expires, then I-CSCF 104 considers the S-CSCF 103 to be out of sync and will be least preferred.

I-CSCF 104 will use Core, status information and capabilities of S-CSCFs 103 to load balance endpoints among all associated S-CSCFs 103.

On receiving a De-registration Core Registration Request (CRR), I-CSCF 104 removes the cores for S-CSCF 103, and S-CSCF 103 is considered to be no longer serving those cores.

On receiving a TERM Service Association request (SVR) from S-CSCF 103, I-CSCF 104 terminates the association and removes all the status information of that S-CSCF 103.

In one embodiment, S-CSCF 103 will perform the following functionality:

On bootup, S-CSCF 103 will initiate a service association with I-CSCF 104 by sending initial Service Association request (SVR). This will include dynamically adjusted capacity and KPI information.

S-CSCF 103 registers supported cores by sending Core Registration Request (CRR).

Periodically refresh status, KPI and dynamically adjusted capacity information by sending REFRESH SVR.

Periodically refresh cores by sending RE-REGISTRATION CRR.

Remove Cores if there is a change in the supported Cores list, by sending a DE-REGISTRATION CRR.

When S-CSCF 103 goes down, it terminates the service association by sending TERM Service Association request (SVR) to I-CSCF 104.

As disclosed, embodiments include an Sc interface between an I-CSCF server and S-CSCF servers that dynamically load balances SIP users over an IMS network. The Sc interface receives dynamically adjusted capacity, based on key performance indicators, and service information, for each S-CSCF server and uses this information to distribute the end users across all available S-CSCF servers.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-readable medium having instructions stored thereon that, when executed by a processor, cause the processor to load balance Session Initiation Protocol (SIP) users over an Internet Protocol Multimedia Subsystem (IMS) network, the load balancing comprising:
   establishing a Diameter connection between a first Serving Call Session Control Function (S-CSCF) server and an Interrogating Call Session Control Function (I-CSCF) server;
   receiving a dynamically adjusted capacity and a status information from the first S-CSCF server;
   receiving from a user equipment a request to initiate a SIP communication session over the IMS network; and
   selecting an assigned S-CSCF server for the SIP communication session based at least on the dynamically adjusted capacity and the status information.

2. The computer-readable medium of claim 1, wherein the assigned S-CSCF server is the first S-CSCF server.

3. The computer-readable medium of claim 1, wherein the assigned S-CSCF server is a second S-CSCF server on the IMS network that is different from the first S-CSCF server.

4. The computer-readable medium of claim 1, wherein the dynamically adjusted capacity is based on runtime key performance indicator (KPI) information of the first S-CSCF server.

5. The computer-readable medium of claim 4, wherein the KPI information comprises at least one of processor capacity, memory capacity, or number of endpoints serviced.

6. The computer-readable medium of claim 1, further establishing a SIP connection between the first S-CSCF server and the I-CSCF server.

7. The computer-readable medium of claim 1, the I-CSCF server further receiving a core name from the first S-CSCF server.

8. A method of load balancing Session Initiation Protocol (SIP) users over an Internet Protocol Multimedia Subsystem (IMS) network, the load balancing comprising:
   establishing a Diameter connection between a first Serving Call Session Control Function (S-CSCF) server and an Interrogating Call Session Control Function (I-CSCF) server;
   receiving a dynamically adjusted capacity and a status information from the first S-CSCF server;
   receiving from a user equipment a request to initiate a SIP communication session over the IMS network; and
   selecting an assigned S-CSCF server for the SIP communication session based at least on the dynamically adjusted capacity and the status information.

9. The method of claim 8, wherein the assigned S-CSCF server is the first S-CSCF server.

10. The method of claim 8, wherein the assigned S-CSCF server is a second S-CSCF server on the IMS network that is different from the first S-CSCF server.

11. The method of claim 8, wherein the dynamically adjusted capacity is based on runtime key performance indicator (KPI) information of the first S-CSCF server.

12. The method of claim 11, wherein the KPI information comprises at least one of processor capacity, memory capacity, or number of endpoints serviced.

13. The method of claim 8, further establishing a SIP connection between the first S-CSCF server and the I-CSCF server.

14. The method of claim 8, the I-CSCF server further receiving a core name from the first S-CSCF server.

15. An Interrogating Call Session Control Function (I-CSCF) server for an Internet Protocol Multimedia Subsystem (IMS) network, the server comprising:
   a connection module that establishes a Diameter interface between a first Serving Call Session Control Function (S-CSCF) server;
   a receiving module that receives a dynamically adjusted capacity and a status information from the first S-CSCF server, and receives from a user equipment a request to initiate a Session Initiation Protocol (SIP) communication session over the IMS network; and
   a selection module that selects an assigned S-CSCF server for the SIP communication session based at least on the dynamically adjusted capacity and the status information to load balance SIP users.

16. The server of claim 15, wherein the assigned S-CSCF server is the first S-CSCF server.

17. The server of claim 15, wherein the assigned S-CSCF server is a second S-CSCF server on the IMS network that is different from the first S-CSCF server.

18. The server of claim 15, wherein the dynamically adjusted capacity is based on runtime key performance indicator (KPI) information of the first S-CSCF server.

19. The server of claim 18, wherein the KPI information comprises at least one of processor capacity, memory capacity, or number of endpoints serviced.

20. The server of claim 15, the receiving module further receiving a core name from the first S-CSCF server.

* * * * *